(12) United States Patent
Bajikar

(10) Patent No.: US 7,117,008 B2
(45) Date of Patent: Oct. 3, 2006

(54) MITIGATING INTERFERENCE AMONG MULTIPLE RADIO DEVICE TYPES

(75) Inventor: Sundeep M. Bajikar, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 676 days.

(21) Appl. No.: 10/038,961

(22) Filed: Jan. 3, 2002

(65) Prior Publication Data

US 2003/0125019 A1 Jul. 3, 2003

(51) Int. Cl.
*H04M 1/00* (2006.01)

(52) U.S. Cl. ............................... 455/552.1; 455/426.1; 455/553.1; 455/90.3

(58) Field of Classification Search ............. 455/553.1, 455/552.1, 73, 88, 420, 79, 82, 462.1, 426.2, 455/552, 90.3, 426.1; 342/357.1, 359.09; 710/62, 33, 36

See application file for complete search history.

(56) References Cited

U.S. PATENT DOCUMENTS

| | | | | |
|---|---|---|---|---|
| 4,635,285 | A * | 1/1987 | Coombes | 455/403 |
| 5,729,829 | A * | 3/1998 | Talwar et al. | 455/63.1 |
| 5,732,359 | A * | 3/1998 | Baranowsky et al. | 455/552.1 |
| 6,107,960 | A * | 8/2000 | Krasner | 342/357.09 |
| 6,138,010 | A * | 10/2000 | Rabe et al. | 455/426.1 |
| 6,272,343 | B1 * | 8/2001 | Pon et al. | 455/434 |
| 6,377,798 | B1 * | 4/2002 | Shaffer et al. | 455/426.1 |
| 6,697,890 | B1 * | 2/2004 | Gulick et al. | 710/62 |
| 6,785,564 | B1 * | 8/2004 | Quigley et al. | 455/574 |
| 6,882,834 | B1 * | 4/2005 | Balboni | 455/255 |
| 2002/0004383 | A1 * | 1/2002 | Koskinen et al. | 455/414 |
| 2002/0111137 | A1 * | 8/2002 | Walkup | 455/22 |
| 2002/0137472 | A1 * | 9/2002 | Quinn et al. | 455/90 |

* cited by examiner

*Primary Examiner*—Dahn Cong Le
(74) *Attorney, Agent, or Firm*—Trop, Pruner & Hu, P.C.

(57) ABSTRACT

At least two types of wireless devices may be simultaneously handled in a system (i.e., on a wireless-enabled platform (e.g., Bluetooth and IEEE 802.11) in a personal computing environment, such as a personal computer system) in a way that substantially mitigates interference between the wireless devices interfacing therewith. To mitigate cross-interference among multiple radio frequency device types while operating in tandem or concurrently, in a wireless communication-enabled personal computer system, transmission and/or reception from and to all radio frequency device types but the active one radio frequency device type may be selectively blocked. In one embodiment, gating signals from at least two active wireless transceivers may be detected. Using the type information of the active wireless transceivers, a priority may be assigned to each active wireless transceiver. Pending transactions associated with each active wireless transceiver may also be tracked. Based on the priority and the pending transactions, communication control may be arbitrated (e.g., through time slicing) between active wireless transceivers.

21 Claims, 4 Drawing Sheets

MITIGATING INTERFERENCE AMONG MULTIPLE RADIO DEVICE TYPES

BACKGROUND

The present invention relates generally to mitigating cross-interference between communication devices in wireless communication systems, and more particularly to systems capable of wirelessly interfacing with several communication device types.

Wireless connectivity for a communication device may be enabled using a medium access control (MAC) and physical layer (PHY) specification within a particular area. Specifically, based on the MAC and PHY specification, access to one or more frequency bands over a communication channel for the purposes of local area communication may be provided. For example, wireless connectivity may be provided to automatic machinery, electronic equipment, or communication devices, which may be fixed, portable, hand-held and/or mobile within a local area.

Although the current focus is on the individual integration of wireless communications technologies into a wireless-enabled platform, it may be beneficial for more than one of these technologies to co-exist in one system. In this way, two or more communication device types may wirelessly interface with a wireless communication system, for example, a wireless-enabled personal computer (PC) system.

A number of short-range and long-range wireless communications technologies, such as Bluetooth or IEEE 802.11, may lend themselves to potential integration with one another in a single wireless communication system. The Bluetooth standard is described in detail in documents entitled "Specifications of the Bluetooth System: Core" and "Specifications of the Bluetooth System: Profiles", both published on July 1999, and are available from the Bluetooth Special Interest Group on the Internet at Bluetooth's official website. The IEEE 802.11 standard is described in detail in a specification entitled "IEEE Std 802.11 1999 Edition," available from IEEE Customer Service Center, 445 Hoes Lane, P.O. Box 1331, Piscataway, N.J. 08855-1331.

While these wireless communications technologies have been fairly well defined in the context of individual usage models, their joint usage models with respect to each other are not yet clearly defined. For instance, it is conceivable to have applications where two or more of these communications technologies may have to operate in tandem or concurrently on the wireless-enabled platform.

Unfortunately, such integration may result in undesired interference between the active radio systems, leading to potential signal loss and/or malfunction of the radio system themselves. A cross-interference problem may occur with the integration of multiple radio devices into a wireless communication system, as an example.

Because of the cross-interference problem, integration of wireless communications technologies (e.g., radio frequency (RF) based) into a PC platform may be difficult to accommodate. Therefore, in some cases a simple implementation of multiple integrated radio systems may not be feasible at all. Moreover, based on a certain combination of usage models or other limitations imposed by original equipment manufactures (OEMs), integration of two or more radio technologies into the PC platform may become even more difficult.

A variety of mechanisms have been contemplated to reduce cross-interference problem between multiple radio devices within a system. Traditional ways of dealing with this problem involve circuits for gain control and filter tuning to reject interference signals.

In particular, a set of complex analog circuits is required to obviate the cross-interference. Typically, such complex analog circuits are used for out-of-band frequency rejection using filter tuning, and gain control, using up valuable hardware real estate. Further, a complex signaling mechanism (e.g., sideband signaling) may need to be deployed in order to support and/or coordinate the filters/gain control circuits, resulting in inefficient usage of available communication bandwidth.

Thus, reduction in cross-interference is desired for communication systems that wirelessly interface with multiple communication devices.

DETAILED DESCRIPTION

Figure 1:
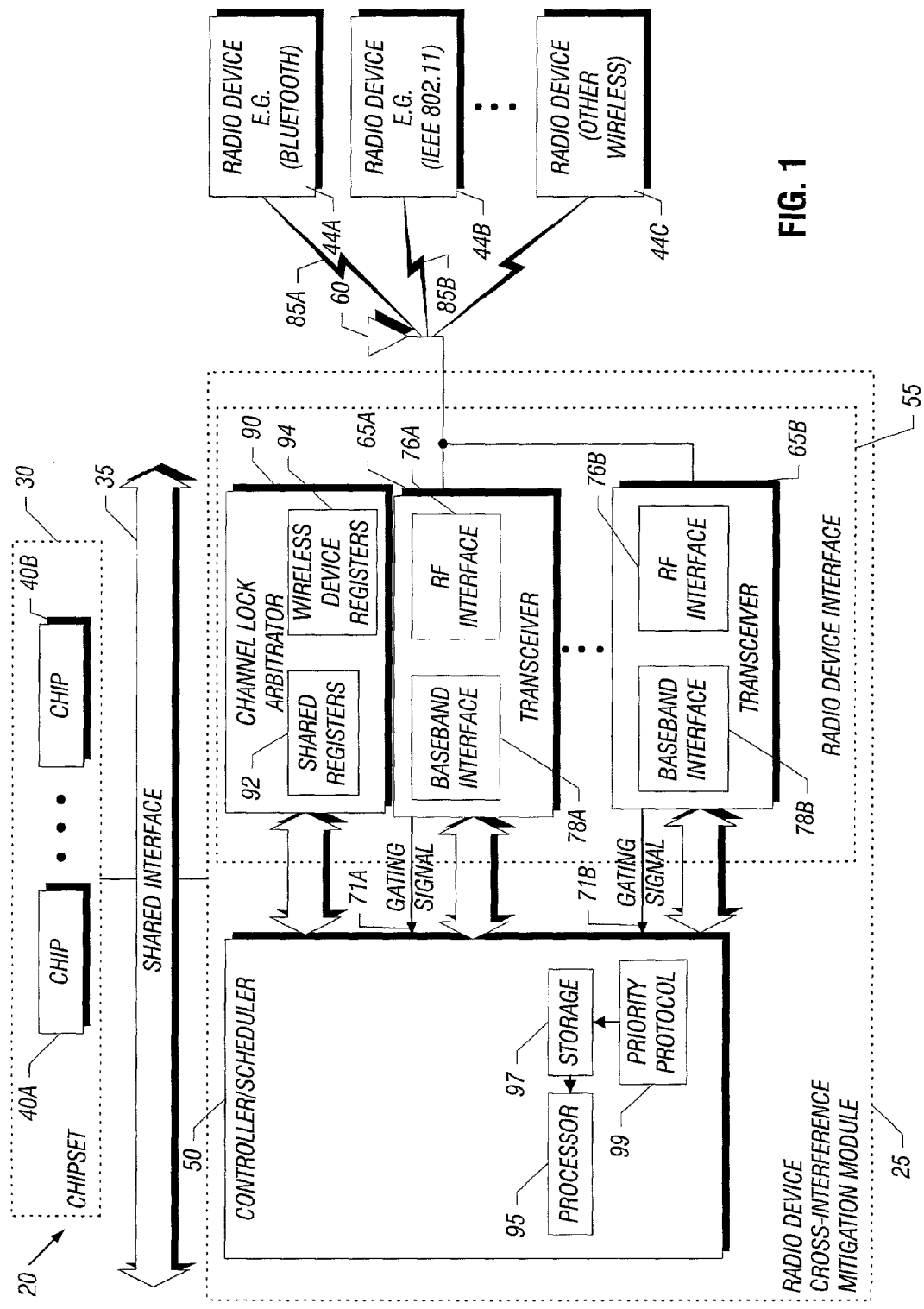
FIG. 1 is a block diagram of a wireless communication system including a radio device cross-interference mitigation module, in accordance with one embodiment of the present invention.

A wireless communication system 20 includes a module 25 for mitigating cross-interference among disparate wireless devices that may be simultaneously active, in accordance with one embodiment of the present invention. For interfacing, the module 25 may be coupled to a chipset 30 through a shared interface 35. Alternatively, the module 25 may be advantageously integrated within the chipset 30 itself. In any event, the chipset 30 may comprise a set of integrated circuits, such as a chip 40A and a chip 40B, providing a predetermined functionality based on a particular application, in one embodiment.

In some embodiments, the wireless communication system 20 may be a processor-based system capable of wirelessly interfacing with several radio device types operating in tandem or concurrently on a wireless-enabled platform, such as in personal computing environments. Several short-range and/or long-range wireless communication standards may be deployed. Using the module 25, for example, cross-interference between different types of radio devices 44, a radio device 44A (e.g., operating in accordance with the Bluetooth standard), a radio device 44B (e.g., operating in accordance with the IEEE 802.11 standard), and/or a radio device 44C (e.g., operating in accordance with one or more other wireless standards) may be substantially mitigated.

In one case, the wireless communication system 20 may be a node in a wireless local area network (LAN). Such node may be advantageously positioned proximate to the radio device 44A, for example, a Bluetooth piconet. The Bluetooth piconet may operate in accordance with the Bluetooth specification. Likewise, the radio device 44B may operate in accordance with one of the wireless LAN standards such as the IEEE 802.11 standard.

However, the radio device 44A and the radio device 44B may operate in the same frequency band such as the 2.4 GHz Industrial, Scientific, and Medical (ISM) band which is minimally regulated. The node may employ the module 25 that is responsible for mitigating potential cross-interference between the Bluetooth piconet (which is not part of the wireless LAN that includes the node) and the IEEE 802.11 standard based radio device.

While embodiments according to the Bluetooth and IEEE 802.11 standards are described, the present invention is not limited to such examples. Of course, while using one or more such standards, cross-interference between wireless transceivers in a variety of circumstances and applications may be significantly reduced.

According to one embodiment of the present invention, the module 25 comprises a controller/scheduler 50 to controllably operate a radio device interface 55 including an antenna 60 for carrying out wireless communications. When prompted, the radio device interface 55 may selectively communicate with the radio device 44A, the radio 44B, and/or the radio device 44C. The radio device interface 55 may further comprise a transceiver 65A and transceiver 65B, both operably coupled to the antenna 60 and the controller/scheduler 50. Each transceiver 65 may correspond to a radio device type in one embodiment and provide an activity signal to the controller/scheduler 50.

Essentially, all of the transceivers 65, i.e., within the radio device interface 55, may be disabled while a selected one of the transceivers 65 is conducting communication with a radio device 44, that is, the radio device 44C, as an example. Activity signals from the respective transceivers 65 may be detected at the controller/scheduler 50, indicating some activity corresponding to the radio device 44A and the radio device 44B, respectively.

In particular, when a first communication activity is detected corresponding to the radio device 44A, the transceiver 65A may provide a gating signal 71A to the controller/scheduler 50. Likewise, when a second communication activity is detected corresponding to the radio device 44B, the transceiver 65B may provide a gating signal 71B to the controller/scheduler 50.

Dynamically, a priority may be assigned to each of the transceiver 65 while a potential communication (pending or anticipated) associated with each of the transceiver 65 may be tracked in one embodiment. Control of communication between the transceivers 65, i.e., transceiver 65A through transceiver 65B may then be arbitrated based on the priority and the potential communications. To this end, one transceiver 65 at a time may then be selectively energized (e.g., powered up or down) based on the control of communication.

For the purposes of handling wireless communications (e.g., radio frequency (RF) communications) and digitally processing such communications, each transceiver may comprise appropriate communication circuitry. That is, as shown in the illustrated embodiment, the transceiver 65A includes an associated RF interface 76A and a baseband interface 78A to enable a first wireless communication 85A between the radio device 44A and the module 25. Similarly to enable a second wireless communication 85B with the radio device 44B, the transceiver 65B may include an associated RF interface 76B and a baseband interface 78B.

Consistent with one embodiment, the radio device interface 55 may further include a channel lock arbitrator 90 being operably coupled to the controller/scheduler 50. For arbitrating control between the first and second wireless communications 85A, 85B, respectively, over a communication channel, a set of shared registers 92, and a set of wireless device specific registers 94 may be provided for the channel lock arbitrator 90.

While the controller/scheduler 50 may be any suitable processor-based unit, in some embodiments, the controller/scheduler 50 may comprise a processor 95, and a storage 97 storing a priority protocol 99. The priority protocol 99, in one embodiment, may include predefined criteria as the basis for assigning a priority to each active transceiver 65. Such predefined criteria may further include a first criterion, a second criterion, and a third criterion.

In one embodiment, the first criterion may be indicative of an overhead associated with a potential communication from/to each transceiver 65. For example, if only a short message is desired to be communicated in compliance with the first criterion of the priority protocol 99, the transceiver 65A may be selected over the transceiver 65B that having a relatively higher cost of data communications in accordance with one embodiment.

Likewise, the second criterion may indicate to the channel lock arbitrator 90 an amount of data needing transfer which is being associated with the potential communication for each transceiver 65. In some embodiments, communicating a particular amount of data may correspond to an available bandwidth for the transceiver 65, as the transceiver 65A may be relatively slower than the transceiver 65B. Using the priority protocol 99, switching between the transceivers 65 (i.e., the transceivers 65A and 65B) may be advantageously carried out based on the available bandwidth. As an example, in some case, a task of downloading may involve transferring a large chunk of data where an appropriate prioritization may be implemented accordingly.

Alternatively, a priority may be assigned to each transceiver 65 based on the third criterion, indicating a power consumption associated with the potential communication for each transceiver 65. For example, the wireless communication system 20 may be a battery operated system. Moreover, the transceiver 65A may be relatively more power hungry than the transceiver 65B. However, based on an intelligent assessment of the battery's life, the channel lock arbitrator 90 may prioritize the transceiver 65A over the transceiver 65B. Of course, by appropriately employing the priority protocol 99, a suitable prioritization scheme may be devised to usefully fit a specific scenario in a wireless-enabled platform or any other similar application.

In operation, the type of each of the wireless transceivers 65 may be first determined. According to the priority protocol 99, and the type of each wireless transceiver 65, device characteristics and priority information may then be derived. Subsequently, the device characteristics and priority information may be sent to each wireless transceiver 65. Using the set of shared registers 92 and the set of wireless device specific registers 94 of the channel lock arbitrator 90, the control of communication may be arbitrated by the controller/scheduler 50. That is, in one embodiment, a communication session associated with one of the active wireless transceivers 65 may be selectively enabled. By relinquishing the control of the communication when the communication session is finished, and transferring the control to another one of the active wireless transceiver interfaces when the communication channel becomes available for another communication session, arbitration of the control of the communication may be accomplished, for example, by time slicing (e.g., allocating available time slots of the communication channel to Bluetooth and IEEE 802.11 transmissions where, for example, the Bluetooth time slots may further be shared among more than one active Bluetooth piconets). As a result, cross-interference between, the transceiver 65A and the transceiver 65B may be substantially mitigated.

Although not shown, in accordance with one embodiment, each transceiver 65 may further include a physical layer unit (PHYU), such as a modulator/demodulator (MO-DEM) and a medium access control unit (MACU) compliant with a desired standard (e.g., Bluetooth or IEEE 802.11). The physical layer unit may receive a received signal strength indication (RSSI) signal from the physical layer unit. The RSSI signal is conventionally utilized in association with what is known as a channel access control. The module 25 uses the raw RSSI data, received from the physical layer unit. The module 25 uses the RSSI data to detect transmission of any radio or wireless devices that are not part of the wireless LAN, such as transmission from a Bluetooth piconet.

Figure 2:
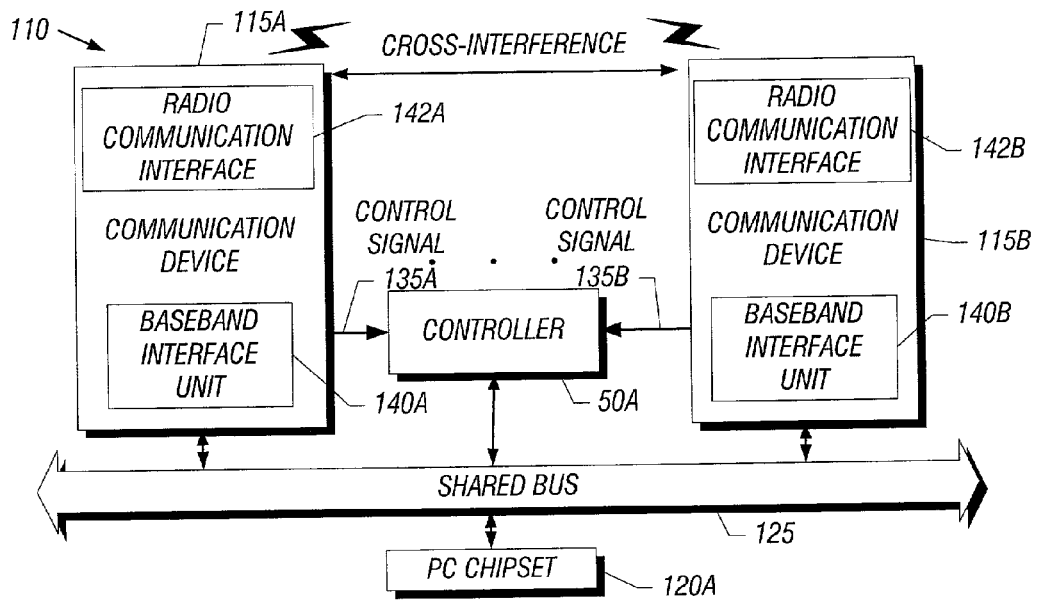
FIG. 2 is a schematic depiction of a hardware-based wireless communication interface that may be employed in the processor-based wireless communication system of FIG. 1 according to one embodiment of the present invention.

A hardware-based wireless communication interface 110 is shown in FIG. 2 that may be employed in the wireless communication system 20 of FIG. 1 according to one embodiment of the present invention. In this case, a communication device 115A and a communication device 115B may interface with a PC chipset 120A through a shared bus 125. A controller 50A coupled to both the communication device 115A and the communication device 115B may control at least in part any radio communication activity at each communication device. To this end, each communication device may provide a signal to the controller 50A indicating local communication activity.

More specifically, the communication device 115A sends a control signal 135A to the controller 50A. Likewise, the communication device 115B sends a control signal 135B to the controller 50A. Both the control signals 135, that is, the control signal 135A and the control signal 135B in the illustrated embodiment may provide to the controller 50A an indication of a communication activity that is either pending, anticipated or undergoing. In one case, based on a control message sent by the PC chipset 120A via the shared bus 125 to the communication device 115A and/or the communication device 115B, individual radio communication activity may be selectively controlled by the controller 50A.

The communication device 115A, in one embodiment, comprises a baseband interface unit 140A and a radio communication interface 142A. In the same manner, the communication device 115B also includes a baseband interface unit 140B and a radio communication interface 142B.

When the controller 50A detects that both of the communication devices 115, (that is, the communication device 115A and the communication device 115B in the depicted embodiment) are active and seeking a communication channel, the control of the communication channel may be arbitrated between the two. In one embodiment, the controller 50A powers down the non-active communication device 115 that was denied the control of the communication channel. In this way, since only one of the two communication devices 115 may be operational at a particular time, cross-interference between the two communication devices 115 may be substantially mitigated.

Figure 3:
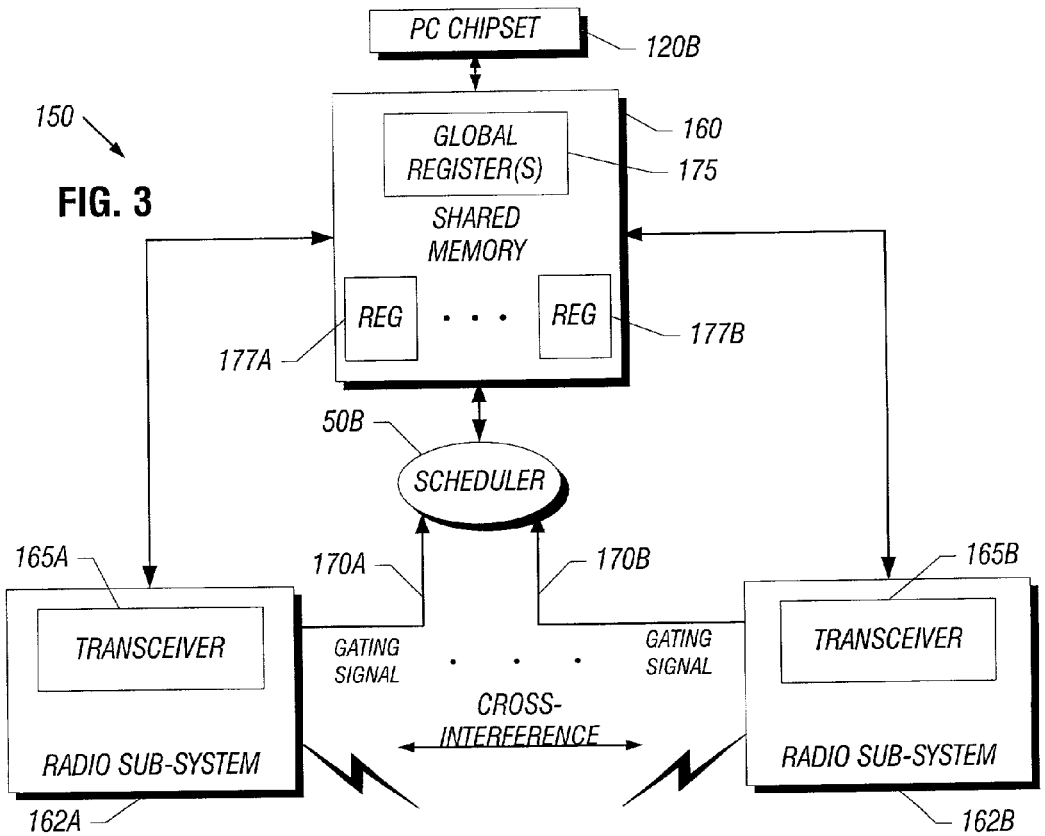
FIG. 3 is a schematic depiction of a software-based wireless communication interface that may be employed in the processor-based wireless communication system of FIG. 1 consistent with one embodiment of the present invention.

A software-based wireless communication interface 150 shown in FIG. 3 may be employed in the wireless communication system 20 of FIG. 1 in one embodiment consistent with the present invention. The software-based wireless communication interface 150 may include a scheduler 50B and a shared memory 160 according to one embodiment. Using the shared memory 160, the scheduler 50B may arbitrate the control of a communication channel between the radio subsystem 162A and the radio subsystem 162B. According to one embodiment, while the radio subsystem 162A may comprise a transceiver 165A, the radio subsystem 162B may include a transceiver 165B to enable bi-directional communications.

When a communication activity occurs in the transceiver 165A, the radio subsystem 162A may provide a gating signal 170A to the scheduler 50B according to one operation of the present invention. Similarly, the radio subsystem 162B may provide a gating signal 170B to the scheduler 50B when another communication activity occurs at the transceiver 165B. In any case, however, both the radio subsystems 162 may employ the shared memory 160 to inform each other about the respective communication activities, which may be either pending, anticipated, or undergoing.

In one embodiment, the shared memory 160 includes a set of global registers 175 and a set of dedicated registers 177A through 177B for facilitating arbitration of the control of the communication channel between the two radio subsystems 162A and 162B. For example, the radio subsystems 162A and 162B may use a shared memory architecture in a semaphore-based implementation according to one embodiment. Such implementation may enable selective blocking off the transmission/reception of a radio communication at the transceiver 165A and/or the transceiver 165B.

In this manner, a selective communication control may be provided to the radio subsystem 162A and the radio subsystem 162B by the scheduler 50B. While the radio subsystem 162A is active, the radio subsystem 162B may be powered down in order for the radio subsystem 162A to continue communication, avoiding cross-interference, as an example.

A PC chipset 120B may also use the shared memory 160 to control at least a portion of the communications from the radio subsystem 162A and the radio subsystem 162B. The scheduler 50B, using the shared memory 160, may provide a global lock feature based on the contents of the global resistors 175 and the registers REG 177A through REG 177B. For example, if both the radio subsystems 162A and 162B attempt to acquire the control of the communication channel, a first indication may be provided in the global registers 175 and a second indication into a local register of the registers REG 177A through REG 177B dedicated to that particular radio subsystem.

Specifically, when the radio subsystem 162A may be given the control of the communication channel a bit may be set in REG 177A. In this way, access to the communication channel may be selectively provided to the radio subsystems 162A and 162B. If a conflict concerning a communication channel control arises, the scheduler 50B may inform the non-active radio subsystem regarding the activity of the active radio subsystem through the global registers 175. For example, if the radio subsystem 162A is active and the radio subsystem 162B desires the control of the communication channel, the scheduler 50B arbitrates such control of the communication channel by indicating to the radio subsystem 162B about the current ownership of the communication channel by the radio subsystem 162.

All of the radio subsystems 162A through 162B may remain in a low power state or in a power down mode until given the ownership of the communication channel. When the radio subsystem 162A is finished communicating and using the global registers 175, an indication may be provided in the shared memory 160 for the radio subsystem 162B to inform that the communication channel is now available.

In one embodiment, one or more access bits may be set in the global registers 175 and registers REG 177A through REG 177B, for the purposes of generating an indication for/by the scheduler 50B as well as the radio subsystem 162A and the radio subsystem 162B. These access bits may inform the scheduler 50B as well as the radio subsystems 162 regarding a non-active state and seeking of the control of the communication channel.

Figure 4:
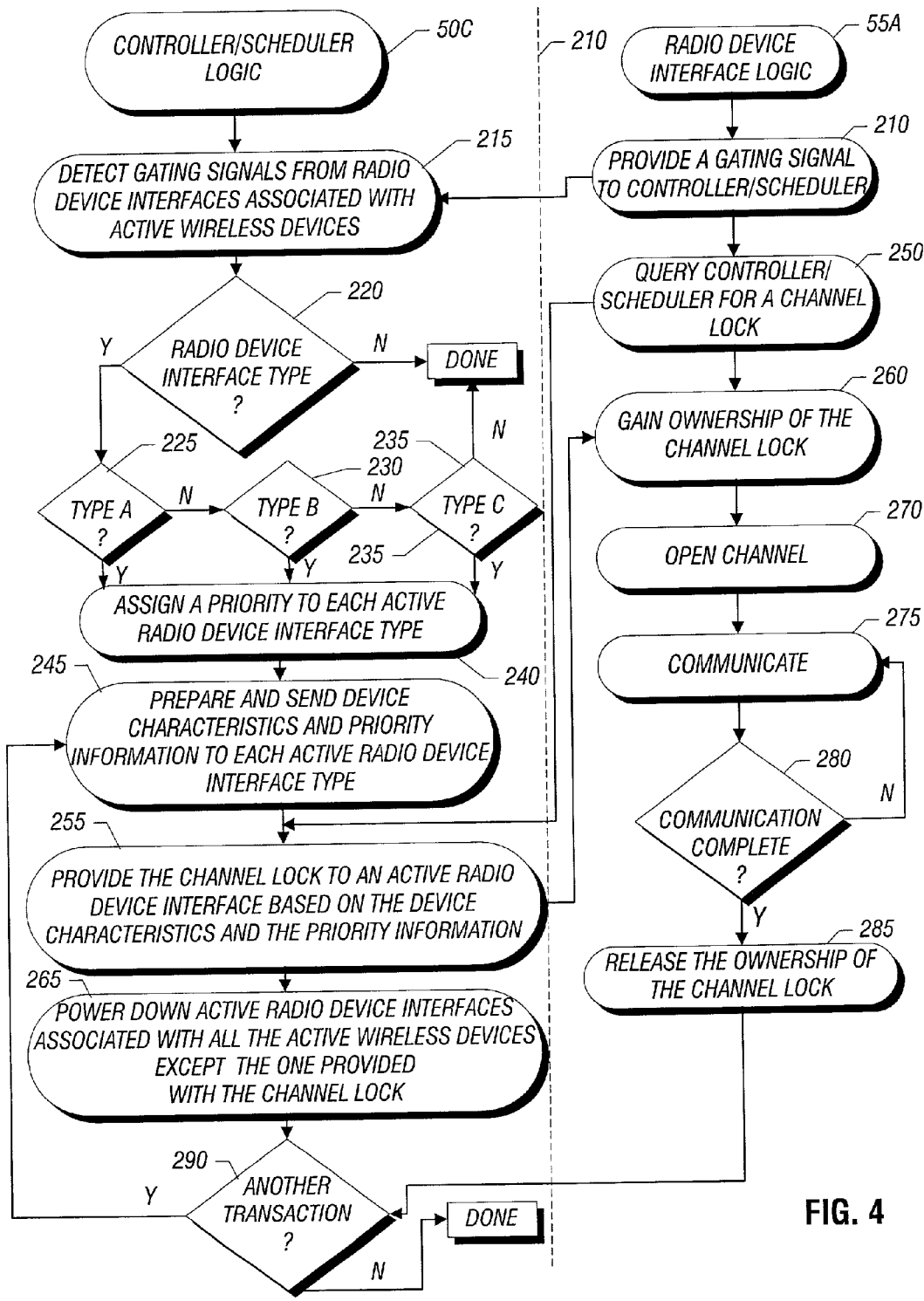
FIG. 4 is a flow chart of interaction between a controller/scheduler logic and a radio device interface logic in accordance with one embodiment of the present invention.

To mitigate cross-interference among radio devices, a controller/scheduler logic 50C (for example, the controller/scheduler 50 of FIG. 1) and a radio device interface logic 55A (for example, the radio device interface 55 of FIG. 1) consistent with one embodiment of the present invention is shown in FIG. 4. A hypothetical dotted line 210 functionally distinguishes the controller/scheduler logic 50C from the radio device interface logic 55A, according to one embodiment. Of course, based on a particular application a desired configuration of the controller/scheduler logic 50C and the radio device interface logic 55A may be suitably deployed.

Interaction between the controller/scheduler logic 50C and the radio device interface logic 55A enables arbitration of a communication channel in accordance with one embodiment of the present invention. Each radio device interface may provide a gating signal to the controller/scheduler logic 50C at block 210. A gating signal may be detected from the radio device interface associated with an active wireless device at 215. Based on the determination of an acceptable radio device interface type at diamond 220, the controller/scheduler logic 50C may proceed to further identify a specific type of the radio device interface.

When the radio device interface type is determined to be a type A radio device interface at diamond 225, the controller/scheduler logic 50C may proceed to the next step. Otherwise, if at diamond 230, a type B radio device interface is determined, then again, the controller/scheduler logic 50C proceeds to the next step. Likewise, if the radio device interface is determined to be of a type C, the controller/scheduler logic 50C proceeds to the next step as well.

In the event that the radio device interface type is found to be unidentifiable, the controller/scheduler logic 50C may terminate. After at least two active radio device interface types are recognized, a priority may be assigned to each such active radio device interface type at block 240. Device characteristics and priority information may then be prepared and subsequently sent to each active radio device interface type at block 245. By querying the controller/scheduler logic 50C, the radio device interface logic 55A may request a channel lock at block 250 for communicating with an associated active wireless device.

Based on the device characteristics and the priority information, in response to one or more channel lock queries, the controller/scheduler logic 50C may provide the channel lock to a selected one of the active device interface at block 255. Thus; the selected active radio device interface type at block 260 may gain ownership of the channel lock. All the active radio device interface types associated with the active wireless devices except the one provided the channel lock may be de-energized (e.g., powered down) at block 265. Once the ownership of the channel lock is gained by the radio device interface logic 55A, a communication channel may be opened at block 270. Therefore, the active wireless device corresponding to the selected active radio device interface type may communicate at block 275.

Once the communication is completed, a determination is made as to whether the selected active wireless device may need to further use the communication channel at diamond 280. If not, the ownership of the channel lock may be released at block 285. In the case another transaction, i.e., more communication (e.g., transmission/reception) is desired, the control may again be provided by the controller/scheduler logic 50C. At this time, new device characteristic and new priority information, which may be dynamically generated in real time, sent to each active ratio device interface type. Conversely, if no potential communication is queued, the controller/scheduler logic 50C completes its current iteration.

Figure 5:
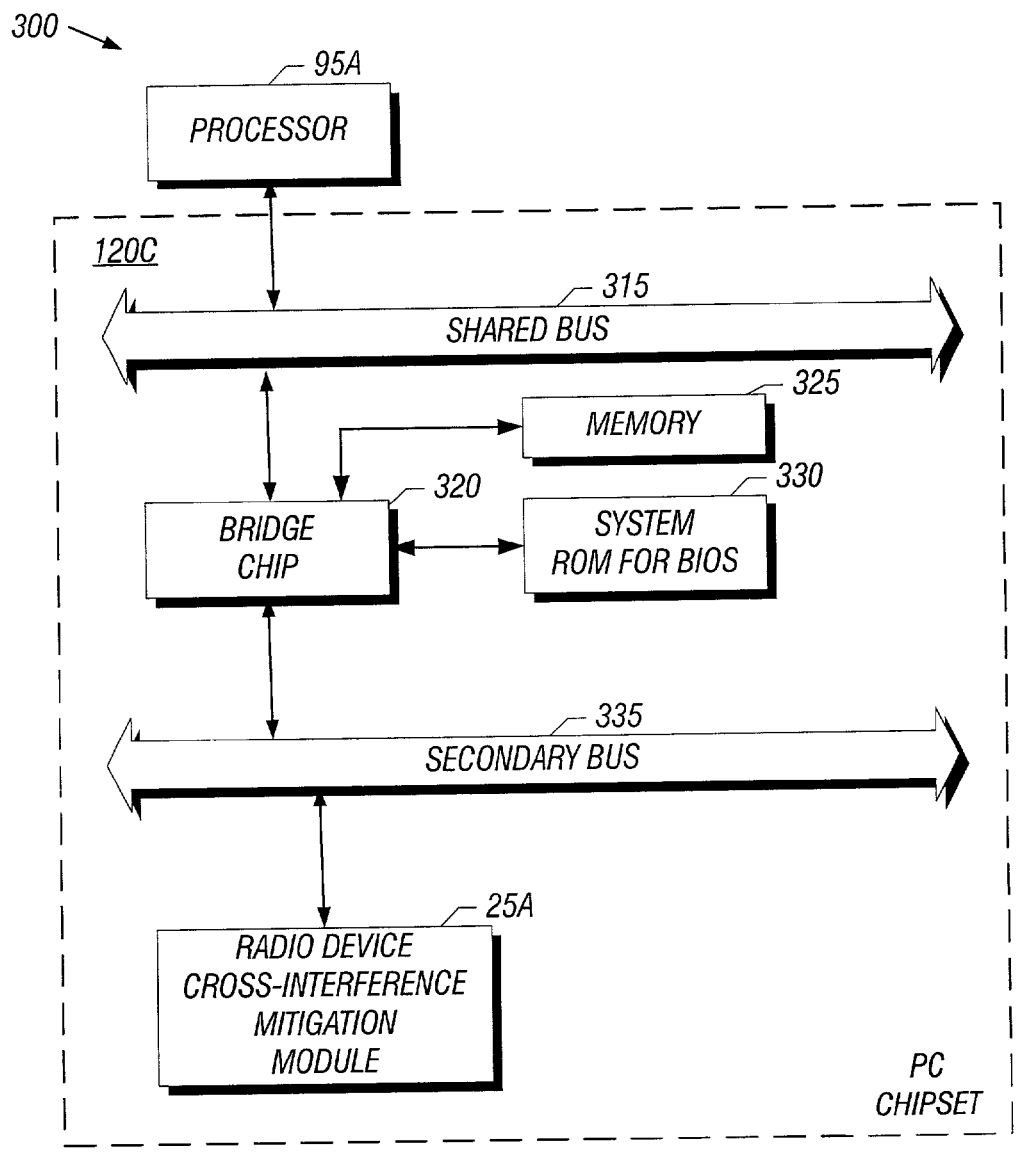
FIG. 5 is a block diagram of a personal computer platform where the radio device cross-interference mitigation module of FIG. 1 may be deployed in accordance with one embodiment of the present invention.

A personal computer (PC) platform/system 300 as shown in FIG. 5 includes a PC chipset 120C and a processor 310. With the PC chipset 120C, the processor 95A interfaces through a shared bus 315. The shared bus 315 may further be coupled to the bridge chip 320. A memory 325 and a system read only memory (ROM) in conjunction with a basic input output system (BIOS) 330 may further be coupled to the bridge chip 320. Using a secondary bus 335, the bridge chip 320 may interface with a radio device cross-interference mitigation module 25A.

Generally, this module 25A may be deployed in the PC platform/system 300 in accordance with any desired wireless communication standard. However, the actual mechanism implemented for cross-interference reduction likely depend on the implementation guidelines (e.g., based on a specific wireless communication standard) for a given communications architecture for a particular PC system.

Several factors may be considered while designing a multi-radio control algorithm for interference mitigation based on a particular embodiment of the present invention. For example, order of priority for transmission/reception for the radio systems available may be pre-programmed. Moreover, criteria on the relative states of the different radio system with respect to each other may be incorporated in advance. Additionally, potential limitations dictated by the platform operating modes (or power management) may also be taken in consideration in some cases.

Therefore, in a PC system having integrated RF and baseband hardware may anticipate activity on any available radio device and use this information to intelligently control the other radio devices to reduce interference. Advantageously, complex radio filter circuits may be avoided along with sideband signaling circuitry to support the filters/gain control circuits may be rendered unnecessary when cross-interference may be controlled according to one embodiment of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   querying a controller to acquire a channel lock for communication via a first one of at least two wireless transceiver interfaces;
   in response to an indication from the controller, gaining ownership of the channel lock based on priority information of the at least two wireless transceiver interfaces, and receiving the priority information and device characteristics in the first one of the at least two wireless transceiver interfaces; and opening a communication channel for a communication session associated with the first one of the at least two wireless transceiver interfaces.

2. The method of claim 1, further comprising:
tracking a potential communication associated with said at least two wireless transceiver interfaces;
arbitrating control of communication between said at least two wireless transceiver interfaces based on the priority information and the potential communication; and
selectively energizing each said wireless transceiver interface based on the control of communication.

3. The method of claim 1, further comprising prioritizing each said wireless transceiver interface based on a first criterion indicative of an overhead associated with a potential communication for each said wireless transceiver interface.

4. The method of claim 1, further comprising prioritizing each said wireless transceiver interface based on a second criterion indicative of an amount of data associated with a potential communication for each said wireless transceiver interface.

5. The method of claim 1, further comprising prioritizing each said wireless transceiver interface based on a third criterion indicative of a power consumption associated with a potential communication for each said wireless transceiver interface.

6. The method of claim 1, including releasing the ownership of the channel lock when the communication session is finished.

7. The method of claim 6, including transferring the ownership of the channel lock to another one of the at least two wireless transceiver interfaces when said communication channel becomes available for another communication session through time slicing.

8. The method of claim 1, further comprising receiving the indication via a dedicated storage associated with the first one of the at least two wireless transceiver interfaces.

9. The method of claim 8, further comprising receiving an indication of a conflict via a global storage associated with the at least two wireless transceiver interfaces.

10. An apparatus comprising:
an antenna;
a first communication interface coupled to the antenna corresponding to a first wireless device;
a second communication interface coupled to the antenna corresponding to a second wireless device; and
a module operably coupled to the first and second communication interfaces to disable communication between the first communication interface and said first wireless device while the second communication interface is conducting communication for said second wireless device, wherein each said communication interface is to query said module to acquire a channel lock for communication via the corresponding wireless device, in response to an indication from said module, gain ownership of the channel lock, open a communication channel for a communication session, and release the ownership of the channel lock when the communication session is finished, wherein said module is to transfer the ownership of the channel lock to another one of the first and second wireless devices when said communication channel becomes available.

11. The apparatus of claim 10, wherein said first communication interface to provide a first activity signal, said second communication interface to provide a second activity signal, and said module to:

detect the first and second activity signals, assign a priority to each said first and second wireless device, track a potential communication associated with each said communication interface, and to arbitrate control of communication between the first and second communication interfaces based on the priority and the potential communication corresponding to said first and second wireless devices; and
selectively energize at least one of the first and second communication interfaces based on the control of communication.

12. The apparatus of claim 10, wherein said module to:
determine a type of and assign a priority to each said wireless device;
derive device characteristics and priority information from the priority and the type of each said wireless device; and
send said device characteristics and priority information to each said communication interface.

13. An article comprising a medium storing instructions that enable a processor-based system to:
receive a query to acquire a channel lock for control of communication from a first one of at least two wireless transceivers;
provide ownership of the channel lock to the first one of the at least two wireless transceivers based on priority information and provide the priority information and device characteristics to the first one of the at least two wireless transceivers; and
receive data of a communication from the first one of the at least two wireless transceivers.

14. The article of claim 13 further storing instructions that enable the processor-based system to;
detect activity signals from the at least two wireless transceivers;
assign a priority to each said wireless transceiver;
track a potential communication associated with at least two of the wireless transceivers;
arbitrate control of communication between the at least two wireless transceivers based on the priority and the potential communication; and
energize one of the at least two wireless transceivers based on the control of communication.

15. The article of claim 13, further comprising instructions that enable the processor-based system to release the ownership of the channel lock when the communication is completed.

16. A processor-based system comprising:
a processor;
a storage coupled to said processor to store a priority protocol to track pending transactions associated with at least two wireless transceivers and prioritize one of said at least two wireless transceivers;
at least two wireless transceiver interface devices coupled to said processor to provide corresponding gating signals associated with the at least two wireless transceivers; and
an arbitration device coupled to said at least two wireless transceiver interface devices to selectively provide communication control to said one of at least two wireless transceivers based on the priority protocol, wherein each said wireless transceiver interface device to query said arbitration device is to acquire a channel lock for communication control, in response to an indication from said arbitration device, gain ownership of the channel lock, open a communication channel for a communication session, and release the ownership of the channel lock when the communication session is finished, wherein said arbitration device is to transfer the ownership of the channel lock to another one of the at least two wireless transceivers when said communication channel becomes available.

17. The processor-based system of claim 16, wherein said arbitration device to power up or down the at least two wireless transceiver interface devices based on the communication control.

18. The processor-based system of claim 17, wherein said arbitration device to:
    determine the type of each said wireless transceiver;
    derive device characteristics and priority information from the priority and the type of each said wireless transceiver; and
    send said device characteristics and priority information to each said wireless transceiver.

19. A personal computer system comprising:
    a processor;
    at least two wireless transceivers coupled to the processor, each of the at least two wireless transceivers to provide a gating signal to indicate activity in a corresponding radio device, wherein the at least two wireless transceivers are to query a controller to acquire a channel lock for communication control, in response to an indication from said controller gain ownership of the channel lock, open a communication channel for a communication session, and release the ownership of the channel lock when the communication session is finished, wherein the controller is to transfer the ownership of the channel lock to another one of the at least two wireless transceivers when said communication channel becomes available; and
    a single antenna coupled to the at least two wireless transceivers to provide radio frequency (RF) signals to and from the at least two wireless transceivers.

20. The personal computer system of claim 19, further comprising the controller coupled to receive each of the gating signals and arbitrate the communication channel between the at least two wireless transceivers.

21. The personal computer system of claim 20, wherein the controller to arbitrate using a priority of each of the at least two wireless transceivers.

* * * * *